(12) United States Patent
Shih

(10) Patent No.: US 10,699,576 B1
(45) Date of Patent: Jun. 30, 2020

(54) TRAVEL SMART COLLISION AVOIDANCE WARNING SYSTEM

(71) Applicant: Po-Han Shih, New Taipei (TW)

(72) Inventor: Po-Han Shih, New Taipei (TW)

( * ) Notice: Subject to any disclaimer, the term of this patent is extended or adjusted under 35 U.S.C. 154(b) by 0 days.

(21) Appl. No.: 16/261,846

(22) Filed: Jan. 30, 2019

(51) Int. Cl.
| G08G 1/16 | (2006.01) |
| G08G 1/00 | (2006.01) |
| H04W 4/44 | (2018.01) |
| H04W 4/46 | (2018.01) |
| H04W 4/40 | (2018.01) |

(52) U.S. Cl.
CPC ............... *G08G 1/16* (2013.01); *G08G 1/20* (2013.01); *H04W 4/40* (2018.02); *H04W 4/44* (2018.02); *H04W 4/46* (2018.02)

(58) Field of Classification Search
CPC combination set(s) only.
See application file for complete search history.

(56) References Cited

U.S. PATENT DOCUMENTS

| 8,994,591 | B2 * | 3/2015 | Dupray | ................ G01C 21/206 |
| | | | | 342/457 |
| 9,650,007 | B1 * | 5/2017 | Snyder | ................ B60R 21/0132 |
| 2010/0036595 | A1 * | 2/2010 | Coy | ..................... G08G 1/0104 |
| | | | | 701/119 |
| 2014/0286644 | A1 * | 9/2014 | Oshima | .................. H04B 10/11 |
| | | | | 398/118 |
| 2016/0150070 | A1 * | 5/2016 | Goren | .................. H04W 4/029 |
| | | | | 455/404.2 |
| 2016/0154407 | A1 * | 6/2016 | Litz | ..................... G01M 17/0074 |
| | | | | 701/23 |
| 2017/0256147 | A1 * | 9/2017 | Shanahan | ................ G08G 1/00 |
| 2018/0267527 | A1 * | 9/2018 | Rubin | .................. G05D 1/0016 |

* cited by examiner

*Primary Examiner* — Van T Trieu
(74) *Attorney, Agent, or Firm* — Rosenberg, Klein & Lee

(57) ABSTRACT

A travel smart collision avoidance warning system is provided, comprising a plurality of mobile devices and a positioning device. Each mobile device is provided with an application program downloaded by a corresponding user. The positioning device is coupled to the application so as to store location information of the mobile devices. Each mobile device comprises a processing unit for the corresponding user to pre-set a detection range of the mobile device and an indicating unit. The processing unit is coupled to the positioning device and calculates whether the other mobile devices will be encountered in a pre-set time according to location information, detection range, and traveling speed of the mobile device. If any of the other mobile devices enter a warning range within the pre-set time, the indicating unit is triggered to provide a warning signal so as to make travel much more brilliant and safe.

14 Claims, 5 Drawing Sheets

TRAVEL SMART COLLISION AVOIDANCE WARNING SYSTEM

BACKGROUND OF THE INVENTION

Field of the Invention

The present invention relates to a safety warning system, and more particularly to a travel smart collision avoidance warning system, which employs mobile communication technology together with P2P network technology so as to make travel brilliantly.

Description of the Prior Art

With the improvements of automotive technology, the current auto-driving level is continuously developing from the second level (Level 2) to the third level (L3), and even the fourth level (L4) according to the standards set by the U.S. Society of Automotive Engineers (SAE). However, it is known that self-driving vehicles nowadays usually have to use certain sensing devices to identify its surrounding environments, comprising using LiDAR, cameras, millimeter wave radar (MMW Radar), and Ultrasonic, and so on. Nevertheless, these solutions so far are still not matured enough. For example, the information collected by self-driving vehicles is still limited to a single vehicle level. If there is a blind spot that cannot be detected by the vehicle, or an invisible remote event occurs, the information must be further derived through the Internet of Vehicles.

Another example is that, although the radar is provided with the most stable detection efficiency, it still cannot be widely used due to its high price. Also, its detection accuracy is not precise enough. For example, if a construction vehicle carrying a spoiler is driving in front and flying dust on the road, it is very likely for the self-driving vehicles to determine that there are obstacles in front everywhere.

Moreover, when it comes to bad weathers such as a storm or a blizzard, it is also very difficult for the self-driving vehicles to detect the correct lane line and obstacles on the road. Under such circumstances, vehicles can only communicate with each other through the technology of Internet of Vehicles (IoV) such that people, vehicles, roads, and cloud platforms can be effectively connected together.

In addition to the technology of Internet of Vehicles, the 10 mm high-precision map application also plays a very important role in autonomous driving. The developments of these three technologies will make the vehicles in the future travel much smarter and achieve effective traffic accident prevention and safety warnings, so as to ensure they can reach the destination safely or independently. It is known that there are about 1.3 billion vehicles in the world, and approximately one billion of them are passenger vehicles. Nevertheless, these vehicles do not have the aforementioned self-driving, sensing, and Internet of Vehicles functions.

Therefore, on account of above, to overcome the abovementioned problems, it should be obvious that there is indeed an urgent need for the professionals in the field for a novel travel smart warning system to be developed that helps travel much smarter and safer than ever. Also, the Internet of Vehicles' functions are equipped without further disposing any new apparatus onto the currently existing vehicles.

SUMMARY OF THE INVENTION

In order to overcome the disadvantages mentioned above, one major objective of the present invention is to employ a global positioning system in conjunction with a geographic data system so as to receive the geographic coordinates of the mobile devices after the satellite broadcast signals are received.

Another objective of the present invention is to utilize the architecture technology of the Internet system and apply it to mobile devices or mobile terminals, such that each mobile device or mobile terminal can directly establish a peer-to-peer private P2P network. As such, a mobile communication technology in conjunction with the P2P network technology is well accomplished.

For achieving the abovementioned objectives, the present invention provides a travel smart collision avoidance warning system comprising a plurality of mobile devices and a positioning device, wherein each of the mobile devices is provided with an application program downloaded by a corresponding user. The positioning device is coupled to the application program so as to store location information of each of the mobile devices. Each of the mobile devices comprises a processing unit and an indicating unit, the processing unit is employed for the corresponding user to pre-set a detection range of the mobile device, and the processing unit is coupled to the positioning device and calculates whether the other mobile devices will be encountered in a pre-set time according to the location information, the detection range, and a traveling speed of the mobile device. If any of the other mobile devices enter a warning range of the mobile device within the pre-set time, the indicating unit is triggered to provide a warning signal.

According to one embodiment of the present invention, the warning signal can be an audio signal or a video signal. A speaker can be optionally disposed for outputting the audio signal and reminding the user. Alternatively, a display unit can be optionally disposed for outputting the video signal and reminding the user. And yet, if the warning signal is a composite signal comprising both the audio and the video signals, then the speaker and the display unit can both be disposed at the same time.

In addition, in practical details, the user is able to register his or her personal account first and then key in the profile, share the street scene, or select the category of other mobile devices that he or she would like to receive through the application program. In one embodiment, mobile device categories that are desired to be received may include but are not limited to an electronic device carried by the user, a car, a motorcycle, a bicycle, or any other vehicles, etc.

In order to achieve real-time vehicle connectivity and communication, the system disclosed in the present invention can also use a Private Peer to Peer (P2P) network technology to connect each of the mobile devices in the same detection range, so that the verified users and/or participants can continuously share their location information of mobile devices with each other through the P2P technology, thereby achieving the purpose of instant messaging (IM) between groups or individuals.

In addition, when the system disclosed in the present application is applied to a vehicle which is provided with the Internet of Vehicles or a self-driving function, the warning signal can also be selectively coupled to the computer of the local vehicle for further determination. As a result, it is believed to be beneficial to expand the dynamic states of the local vehicle's computer for determining and getting aware of its surrounding environmental vehicles or pedestrians.

As a result, the travel smart collision avoidance warning system disclosed by the present invention is aimed to provide an estimated warning of collision avoidance for a local mobile device that may collide with other mobile devices based on the spatial coordinates shared by the mobile devices in a specific scope, which are corresponding to the geographic location of the GIS, and on the calculation of the Location Based Service (LBS). The information of all the other mobile devices (including vehicles and pedestrians) within a particular range as well as a map of the area to be driven in can all be shown by using a display unit. As a result, such a safety assistance system for collision prevention during travel is provided by the present invention.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
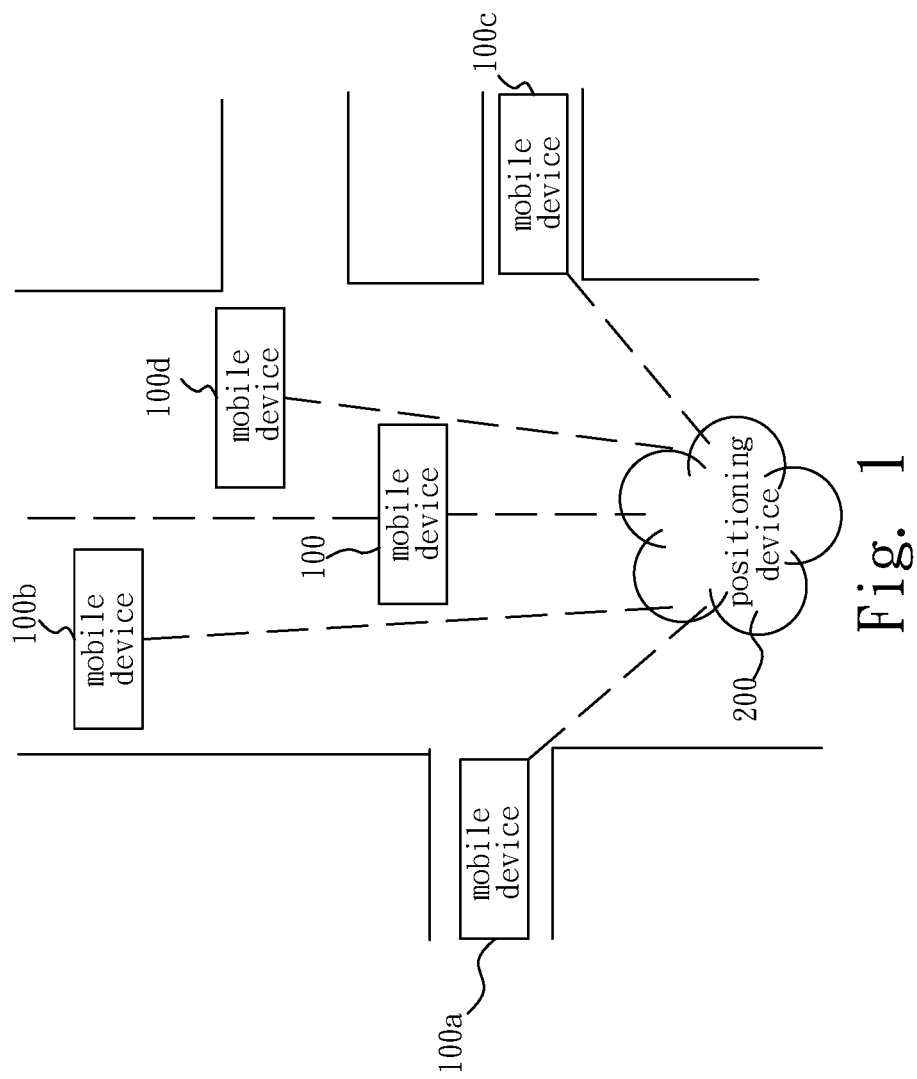
FIG. 1 shows a schematic diagram of a travel smart collision avoidance warning system according to a preferred embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

In the prior art, since most of the vehicles today do not have the ability to self-drive, sense, and connect to the Internet, traffic accident prevention and safety warnings cannot be achieved effectively. To solve these shortcomings, the present invention proposes a better and improved design in view of the purpose, which is a travel smart collision avoidance warning system applicable to both people and vehicles. In order to make people have a better understanding about the technical contents of the present invention, please refer to FIG. 1 first, which is a schematic diagram of a structure according to a preferred embodiment of the present invention. As shown in FIG. 1, the travel smart collision avoidance warning system of the present invention comprises a plurality of mobile devices 100, 100a, 100b, 100c, 100d and a positioning device 200, wherein each mobile device 100, 100a, 100b, 100c, 100d is provided with an application program downloaded by a corresponding user.

According to an embodiment of the present invention, the application program may be, for example, an APP that is written in view of the Internet system architecture technology and is available for being downloaded and for use by users. For example, the application program can be downloaded and installed in each electronic device of the user who downloaded the APP. The electronic device, for instance, can be a user's mobile phone, tablet, personal digital assistant, smart watch, and so on. Alternatively, the application program can also be downloaded by the user and directly installed in an integrated chip of each mobile device 100, 100a, 100b, 100c, 100d, such as a GPS chip, so as to form an in-vehicle mobile device, a vehicle-mounted mobile device, or a wearable mobile device. According to the present invention, the types of integrated chips that the application program is downloaded and installed in the mobile device are not limited to GPS chips. In other words, according to other embodiments of the present application, the application program can also be downloaded and integrated into the system on chip (SOC) of the mobile device, and the like can also be used to implement the present invention.

In this case, each mobile device 100, 100a, 100b, 100c, 100d disclosed in the present invention may belong to an electronic device carried by the user, a car, a motorcycle, or a bicycle. If the mobile device belongs to a vehicle, then the application program can be downloaded and installed in the electronic device of the vehicle; or the application program can be downloaded and installed in the GPS chip or other electronic chips, such as collision warning ICs which are equipped with the vehicle and the like can also be used to implement the present invention.

The positioning device 200 is coupled to the application program so as to store the location information of each mobile device 100, 100a, 100b, 100c, 100d. According to an embodiment of the present invention, the location information of the mobile devices 100, 100a, 100b, 100c, and 100d are simultaneously transmitted through a Global Positioning System (GPS) and a Geographic Information System (GIS). That is to say, the present invention reveals a novel composite system using both GPS and GIS, wherein the geographic information system being used can flexibly select different levels of maps according to a variety of different users.

For example, the system disclosed in the present invention can be operated by general users or high-level users. When a user belongs to a general user, the system is configured to provide a general Google map or choose to use the original configuration of the vehicle itself. As for a user belonging to a high-level user, the system is configured to provide a high-precision map and to display the location information of the corresponding mobile device in a hierarchy of, for example, 10 mm.

Figure 2:
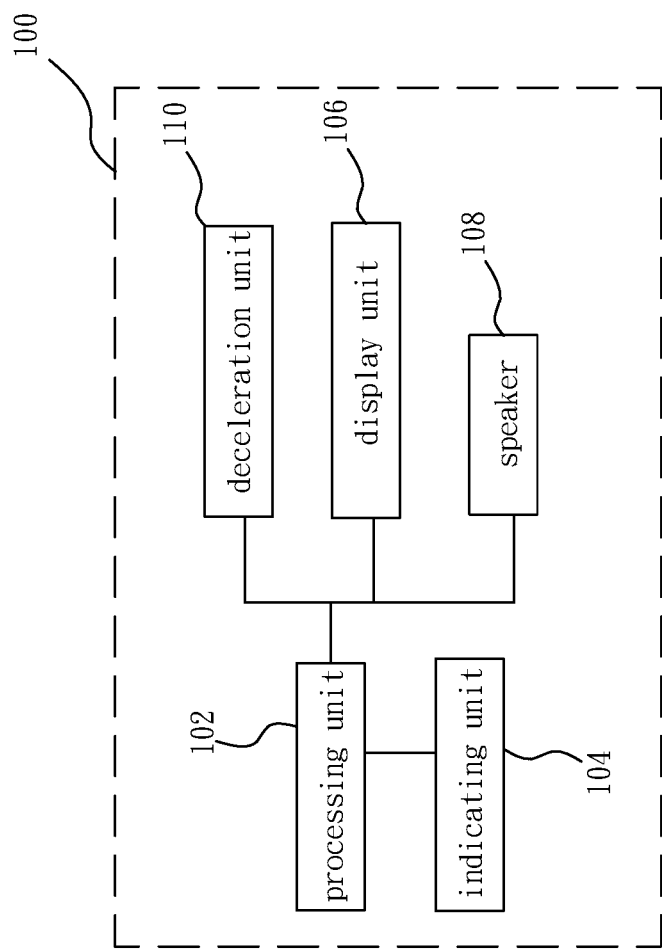
FIG. 2 shows a schematic structural diagram of a mobile device according to one embodiment of the present invention.

Refer to FIG. 2 please, which is a schematic structural diagram of a mobile device according to one embodiment of the present invention. As shown in FIG. 2, the mobile device 100 is taken as an example. The mobile device 100 comprises at least one processing unit 102 and an indicating unit 104. For example, the processing unit 102 can be a microprocessor (MCU) for the user to pre-set a detection range of the mobile device 100.

In practical details, according to the embodiment of the present invention, when the user downloads the application program, the user is able to register his or her personal account first and then key in the profile, share the street scene, or select the category of other mobile devices that he or she would like to receive through the application. After the verification process is complete, the user may get started with operating the APP. In one embodiment, the personal profile may include, for example, the brand, model, and color of the vehicle; other mobile device categories that are desired to be received may include, but are not limited to, automobiles, trucks, fire engines, motorcycles, or pedestrians, and the like. And, the street scenes which can be shared may also include, but are not limited to, laneways, general roads, expressways, highways, and the like.

Subsequently, when the user would like to set a detection range of the mobile device 100 by using the processing unit 102, the system will use the geographical position where the user is located as a center point, thereby setting the detection range, having a longer longitudinal distance and a shorter broadwise distance. As a result, dynamic alerts associated with all other verified users and their geographic locations of the mobile devices within this detection range will be shown. According to an embodiment of the present invention, the detection range can be used for users to be aware of the location of the mobile device by map positioning, wherein it is necessary to predefine a longitudinal distance and a broadwise distance for the detection range. Generally speaking, the longitudinal distance can be determined by the user, while the broadwise distance is usually related to the width of the road to be driven.

Regarding defining the longitudinal distance, the user first determines a traveling speed and the number of traveling seconds of the corresponding mobile device, which will be the traveling speed and the traveling seconds of the vehicle if the mobile device belongs to a vehicle. When the location of the vehicle serves as a center point, according to the traveling speed, the forward distance equals to M meters, and the backward distance equals to (0.5M) meters, so the total longitudinal distance from the front to the rear end will be (1.5M) meters.

In the case of highways and expressways, when the vehicle has a speed of 100 km/h and the traveling seconds are 15 seconds, based on the location of the vehicle serving as a center point, a forward distance 417 meters and a backward distance 208 meters are summed to derive the longitudinal distance 625 meters. On the other hand, in the case of a general road, when the vehicle has a speed of 60 km/h and the traveling seconds are 15 seconds, based on the location of the vehicle serving as a center point, a forward distance 250 meters and a backward distance 125 meters are summed to derive the longitudinal distance 375 meters.

As for the setting of the broadwise distance, in the case of highways and expressways, the width of the highway or the expressway indicated by the map is taken as a standard width of the broadwise distance; nevertheless, if the vehicle is driven on a general road, considering the incoming and outgoing vehicles from the left and right lateral roads, a left and right lateral distance from each of the directions must not be less than 40 meters when the vehicle serves as a center point. That is to say, a total broadwise distance must be at least 80 meters. This information is derived from the minimum safe distance data provided by the Freeway Bureau Office.

Therefore, in an embodiment, if the location information of the mobile device belongs to a highway, the detection range can be set, for example, to have a longitudinal distance 625 meters and a broadwise distance 30 meters. In another embodiment, if the location information of the mobile device belongs to a general road, then the detection range may be set to have a longitudinal distance 375 meters and a broadwise distance 80 meters.

Therefore, according to the embodiment of the present invention, the processing unit 102 is coupled to the positioning device 200 to calculate whether the other mobile devices 100a, 100b, 100c or 100d will be encountered in a pre-set time according to the location information of the mobile device 100, the detection range, and the traveling speed of the mobile device 100. According to an embodiment of the present invention, the pre-set time can be predefined, for example, as 10 seconds, 20 seconds or 1 minute, and the like. Thereafter, the processing unit 102 calculates that if the other mobile devices 100a, 100b, 100c or 100d will enter a warning range of the mobile device 100 within the pre-set time, under the circumstances that all other conditions remain unchanged and there is no deceleration. If so, the indicating unit 104 will be triggered to provide a warning signal.

Figure 3:
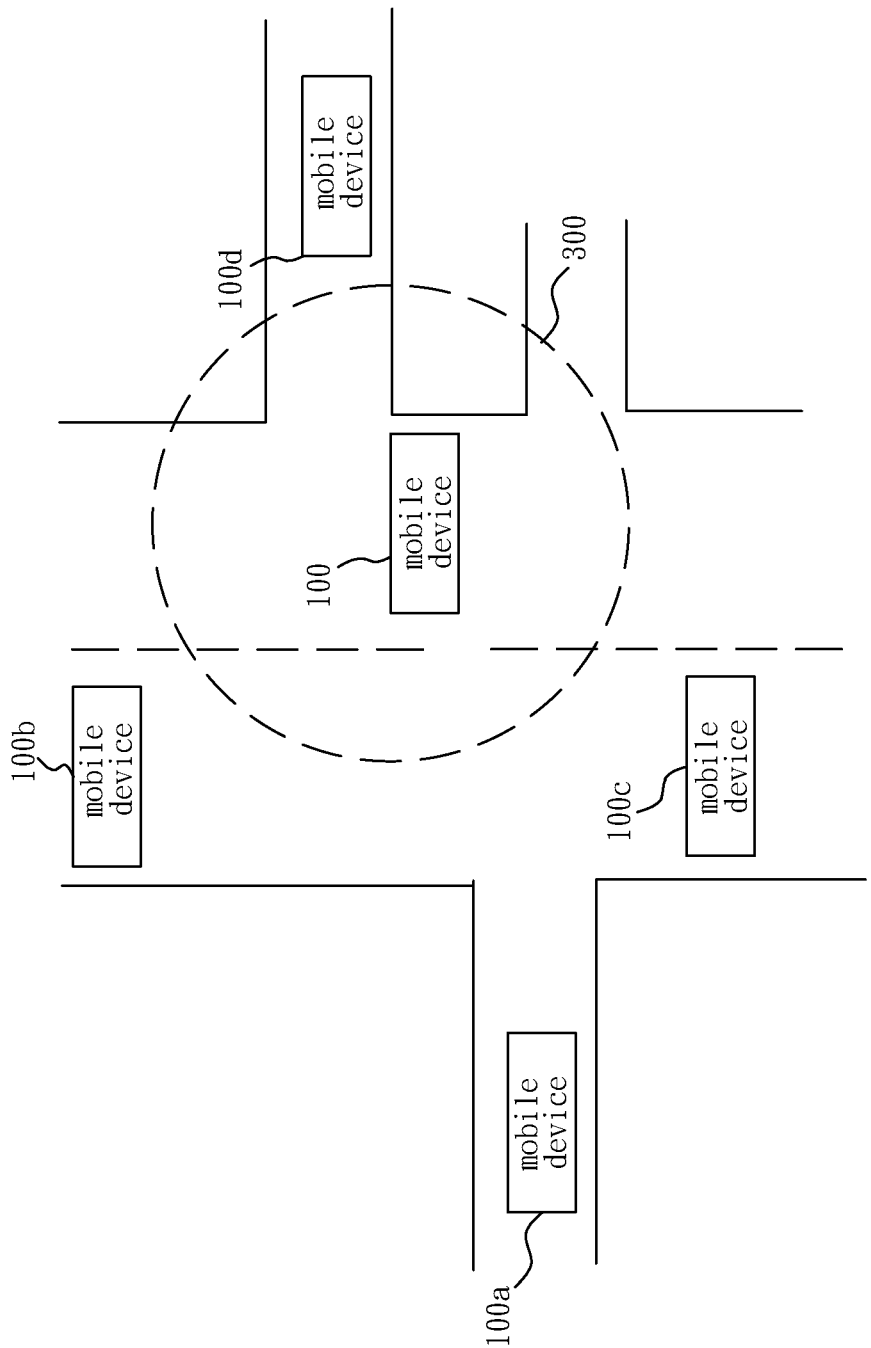
FIG. 3 shows a schematic diagram of other mobile device entering a warning range of the local mobile device in accordance with one embodiment of the present invention.

Please refer to FIG. 3, which is a schematic diagram of a mobile device 100d entering a warning range 300 of the mobile device 100 in accordance with one embodiment of the present invention. As shown in FIG. 3, the indicating unit 104 is triggered at this time, and a warning signal is generated to remind the user. According to an embodiment of the present invention, when the distance between the mobile device 100 and the mobile device 100d divided by the traveling speed of the mobile device 100 is less than 3 seconds, the system drives the indicating unit 104 to provide the warning signal so as to remind the user.

According to the present invention, the warning signal can be an audio signal, a video signal, or a composite signal comprising both the audio and the video signals.

In one embodiment, when the warning signal comprises an audio signal, a speaker 108 can be optionally disposed for outputting the audio signal and reminding the user. In such an embodiment, the speaker 108, for example, can be a horn, car stereo, or a buzzer.

However, in another embodiment of the present invention, when the warning signal further comprises a video signal, a display unit 106 can be optionally disposed for outputting the video signal and reminding the user. According to the embodiment of the present invention, the display unit 106, for example, can be but not limited to a display screen or a vehicle head-up display (HUD). For those who have ordinary knowledge and skilled in the art are allowed to modify and change the designs according to their actual implementation levels under the technical enlightenment of the present invention, and nevertheless shall still fall in the scope of the present invention.

Furthermore, when the display unit 106 is disposed in the mobile device 100, images of all other mobile devices 100a, 100b, 100c, and 100d may also be displayed on the display unit 106 for presentation to the user. When the vehicle is provided with the Internet of Vehicles or self-driving function, then the warning signal can also be selectively coupled to the computer of the local vehicle for further determination. As a result, it is believed to be beneficial to expand the dynamic states of the local vehicle's computer for determining and getting aware of its surrounding environmental vehicles or pedestrians.

Moreover, for the safety of self-driving, as shown in FIG. 2, a deceleration unit 110 may be further disposed in the mobile device 100 when necessary. When the processing unit 102 calculates that other mobile devices 100a, 100b, 100c or 100d will be encountered within the pre-set time, and the distance between the mobile device 100 and other encountered mobile devices divided by the travelling speed of the mobile device 100 is less than 2 seconds, the deceleration unit 110 on the mobile device 100 can be triggered to achieve the effect of automatic deceleration. And thus, the collision is prevented.

Figure 4:
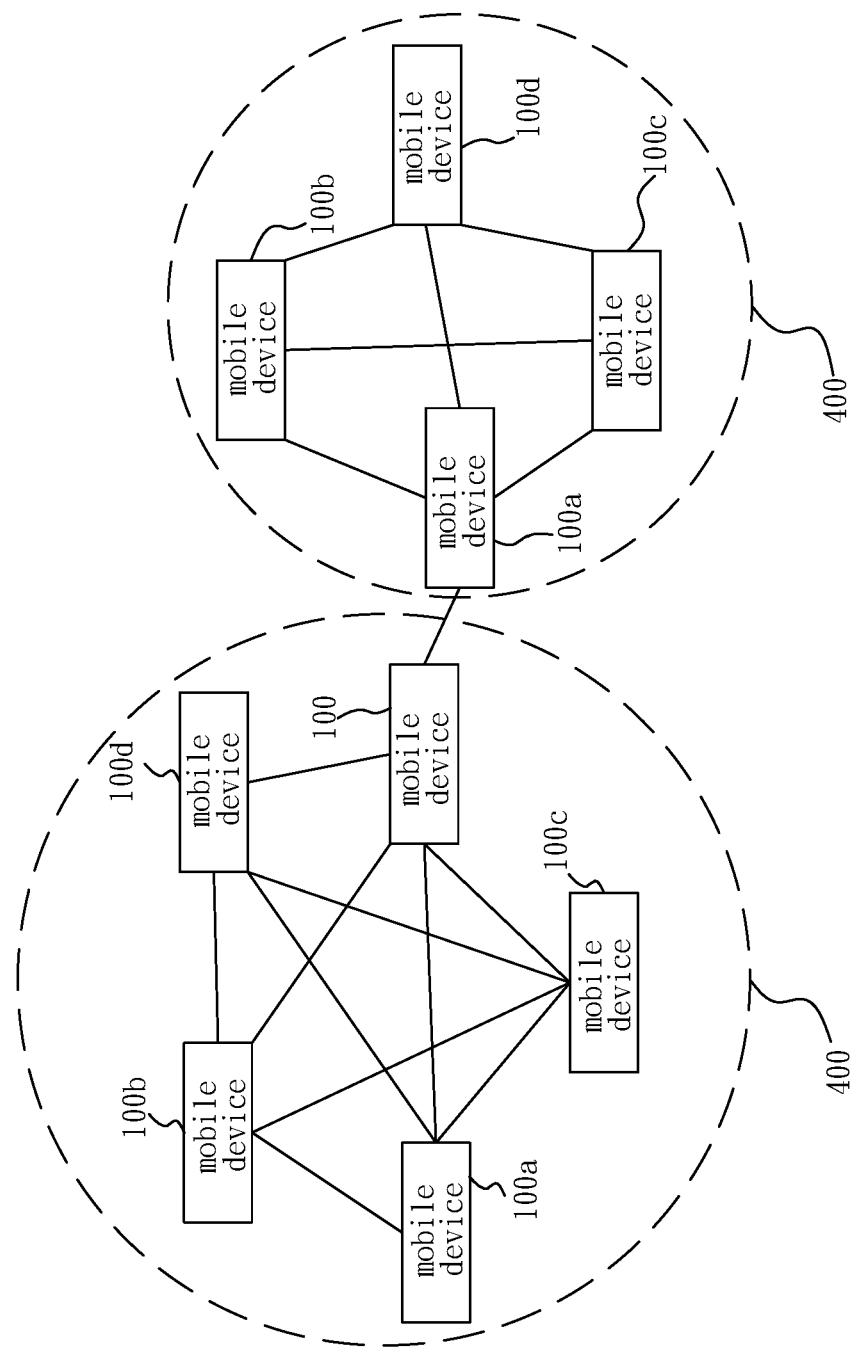
FIG. 4 shows a schematic diagram of a plurality of mobile devices connected by a private communication network according to one embodiment of the present invention.

In one embodiment of the present invention, when a plurality of mobile devices belong to vehicles, a vehicle manufacturing company may provide an official account and use the vehicle identification number (VIN) of each mobile device as the sub-accounts. These sub-accounts then can be employed as keys for sharing information between the mobile devices. Referring to FIG. 4, it is a schematic diagram of a plurality of mobile devices connected by a private communication network according to an embodiment of the present invention. In this case, each mobile device 100, 100a, 100b, 100c, 100d within the same detection range 400 can be connected to each other by a Private Peer to Peer (P2P). The verified users and/or participants can continuously share their location information of each mobile device 100, 100a, 100b, 100c, 100d with each other through the P2P technology. Moreover, owing to this important technical feature, the travel smart collision avoidance warning system disclosed by the present invention can further provide a purpose of a specific group of instant messaging (IM) within the same detection range 400, such as a motorcade comprising the motorcycles, bicycles or even the car fleet, etc., Therefore, the effect of connecting and communicating with each of the vehicles in real-time is achieved, and the application scope of the present invention is expanded as well.

As a result, the travel smart collision avoidance warning system disclosed by the present invention is aimed to provide an estimated warning of collision avoidance for a local mobile device that may collide with other mobile devices based on the spatial coordinates shared by the mobile devices in a specific scope, which are corresponding to the geographic location of the GIS, and on the calculation of the Location Based Service (LBS). The information of all the other mobile devices (including vehicles and pedestrians) within a particular range as well as a map of the area to be driven in can all be shown by using a display screen on the device or the head-up display of the vehicle. Thereby such a safety assistance system for collision prevention during travel of the present invention is provided.

According to the present invention, it can further be applied to pedestrians, especially blind people or children. Since visually disabled people indeed have much more difficulty in travel than ordinary people, various obstacles on the road and in the environment are quite dangerous for those who have never been trained in direct traveling. In the same manners, since children's reactions are not as agile as adults and it is also not easy for children to determine whether or not there is danger in the surrounding environments, walking on the roads or in the environments are challenging for them, too. Therefore, when applying the present invention to the blind people or children, it is believed to be much more practical, so that the surrounding vehicles can accurately identify their locations, avoid collisions with them, and achieve the purpose of assuring the safety of the blind people and children. In another aspect, the blind people and children can also receive other vehicle location messages by wearing a smartwatch (or mobile phone) in which the proposed system has been installed, so a vibration alert or warning sound can be generated to hint them as there are vehicles entering the set range. Although there is a winding road at night or in the suburbs, it can be still quite accurate. Moreover, especially when applied to bad weather, or when the perceived sensing signal is blocked by the preceding or side vehicles, the warning signal issued by the present system will become one of the most important sources for determination.

In addition, when the whistle of an ambulance or a fire engine is often heard on the road, but no exact direction and position are known, the travel smart collision avoidance warning system proposed by the present invention will still give priority to show the location of these priority vehicles so as to hint and alert the user in mobile device, whether they will meet within the set time or not.

Furthermore, the travel smart collision avoidance warning system disclosed in the present invention can also be designed to provide preliminary warning signals for vehicles that enter the main roads from the side lanes. Therefore, to sum up, the present invention is aimed to solve the shortcomings and issues occurred in the prior arts for a long time, and to propose an innovative safety warning auxiliary system instead. By the integration of the proposed system, it can effectively reduce the traffic accidents so far and improve the user's road safety.

Figure 5:
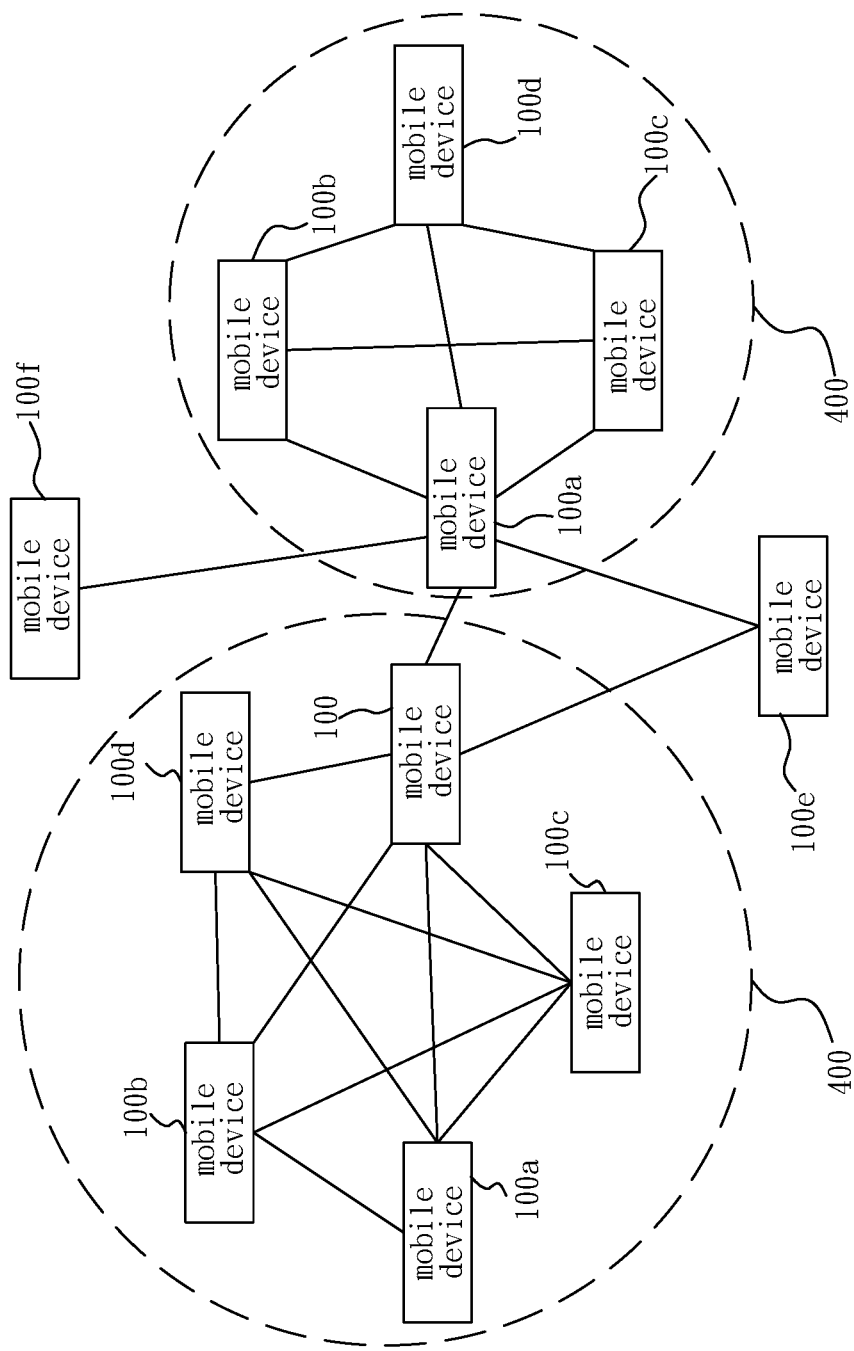
FIG. 5 shows a schematic diagram of a plurality of mobile devices connected by a private communication network according to another embodiment of the present invention.

Furthermore, according to the embodiment shown in FIG. 4, if the mobile devices belong to electronic devices carried by a group of users, in other words, when a group of users agrees to travel together, then these users can use the application program disclosed in the present invention to set up a temporary travel group. In such a group, the road or the scenery in the application is not limited to general roads, lanes, mountain roads, trails, and so on. These users in the temporary travel group who have downloaded the same application program can use the communication function of the group to expand their communication range to infinity. Moreover, it can be used in combination with the original display function. For example, as shown in FIG. 5, the positional image signals of the common traveler (corresponding to the mobile devices 100e, 100f) outside the original detection range 400 can be displayed on the display unit by independently zoom the viewport out or by some other manners. In this way, the users in the common travel group are allowed to have individual communication or group communication functions through the P2P technology.

In addition, according to other embodiments of the present invention, the aforementioned applications can also be extended to navigation purposes, especially in the sightseeing tour groups. However, the present invention is not limited thereto. The tour guide is able to perform commentary of scenes as well as control of tourist's positions by such an extended application and its communication function therein.

Therefore, in view of the above, when compared with the prior arts, it is apparent that the travel smart collision avoidance warning system disclosed by the present invention provides excellent industrial utilization and is highly competitive. Meanwhile, it solves so many shortcomings which have been existed in both the traditional vehicles or in the sensing systems used in vehicles with self-driving functions. More than one billion vehicles nowadays are believed to be able for being installed and used worldwide. As a result, it is obvious that the technical characteristics, means, methods, and effects achieved by the present invention are significantly distinct from the traditional ones and is not easy for those who are familiar with the technology to complete, thereby being patentable for sure.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A travel smart collision avoidance warning system, comprising:
   a plurality of mobile devices, wherein each of the mobile devices is provided with an application program downloaded by a corresponding user; and
   a positioning device, being coupled to the application program so as to store location information of each of the mobile devices;
   wherein, each of the mobile devices comprises a processing unit and an indicating unit, the processing unit is employed for the corresponding user to pre-set a detection range of the mobile device, the processing unit is coupled to the positioning device and calculates whether the other mobile devices will be encountered in a pre-set time according to the location information, the detection range, and a traveling speed of the mobile device, and if any of the other mobile devices enter a warning range of the mobile device within the pre-set time, the indicating unit is triggered to provide a warning signal, and
   wherein when the plurality of mobile devices belong to vehicles, a vehicle manufacturing company provides an official account and uses vehicle identification numbers (VIN) of each of the mobile devices as sub-accounts, the sub-accounts are employed as keys for sharing information between the mobile devices, and each of the mobile devices within the same detection range is connected to each other by a Private Peer to Peer (P2P).

2. The travel smart collision avoidance warning system according to claim 1, wherein the warning signal is an audio signal or a video signal.

3. The travel smart collision avoidance warning system according to claim 2, further comprising:
   a display unit disposed for outputting the video signal and reminding the user.

4. The travel smart collision avoidance warning system according to claim 3, wherein images of all the other mobile devices are displayed on the display unit for presentation to the user.

5. The travel smart collision avoidance warning system according to claim 2, further comprising:
   a speaker disposed for outputting the audio signal and reminding the user.

6. The travel smart collision avoidance warning system according to claim 1, wherein the user is able to register his or her personal account and key in profile, share street scene, or select category of other mobile devices that he or she would like to receive through the application program.

7. The travel smart collision avoidance warning system according to claim 6, wherein the category of each of the mobile devices includes an electronic device carried by the user, a car, a motorcycle, or a bicycle.

8. The travel smart collision avoidance warning system according to claim 1, wherein positional image signals of the mobile devices outside the pre-set detection range can be displayed on a display unit by independently zoom a viewport out such that each of the mobile devices is able to perform individual communication or group communication functions therein between.

9. The travel smart collision avoidance warning system according to claim 1, wherein the location information of the mobile devices is simultaneously transmitted through a Global Positioning System (GPS) and a Geographic Information System (GIS).

10. The travel smart collision avoidance warning system according to claim 9, wherein the geographic information system is configured to provide a general Google map or a high-precision map.

11. The travel smart collision avoidance warning system according to claim 1, wherein the application program is downloaded and installed in an electronic device of each the user, or directly installed in an integrated chip of each of the mobile devices.

12. The travel smart collision avoidance warning system according to claim 1, wherein when the processing unit calculates that the other mobile devices will be encountered within the pre-set time, a deceleration unit on the mobile device is triggered to avoid collision.

13. The travel smart collision avoidance warning system according to claim 1, wherein a geographical position where the user is located serves as a center point of the detection range, and the detection range is set to have a longitudinal distance and a broadwise distance based on the center point.

14. The travel smart collision avoidance warning system according to claim 13, wherein the longitudinal distance is determined by the user and is associated with the traveling speed and traveling seconds of the corresponding mobile device.

* * * * *